United States Patent

Fox

[15] 3,697,813
[45] Oct. 10, 1972

[54] TRIPPING CIRCUIT FOR STATIC SWITCHES

[72] Inventor: David A. Fox, Lima, Ohio

[73] Assignee: Westinghouse Electric Corporation, Pittsburgh, Pa.

[22] Filed: March 15, 1971

[21] Appl. No.: 124,309

[52] U.S. Cl........317/36 TD, 317/141 S, 317/148 SR
[51] Int. Cl..............................................H01h 47/18
[58] Field of Search........317/36 TD, 141 S, 33, 142, 317/148.5 R, 148.5 B

[56] References Cited

UNITED STATES PATENTS 3,573,555  4/1971  Lipnitz..................317/36 TD
3,434,011  3/1969  Zocholl.............317/36 TD X Primary Examiner—Gerald Goldberg
Attorney—A. T. Stratton, F. P. Lyle and Gordon H. Telfer

[57] ABSTRACT

A D.C. trip circuit is provided for power system wiring protection during faults and overloads, which circuit closely approximates the characteristics of previously used thermal circuit breakers, particularly the trip time. Solid state components are used to develop a signal whose magnitude depends on simple circuit functions yet is effective to produce a trip signal wherever its magnitude is equal to or greater than zero. The trip time is close to that resulting from an $I^2T$ (load current squared times trip time) value while requiring simpler, and hence more reliable, components to determine.

3 Claims, 3 Drawing Figures

INVENTOR
David A. Fox 3,697,813

TRIPPING CIRCUIT FOR STATIC SWITCHES

BACKGROUND OF THE INVENTION

1. Field of the Invention

The invention relates to electronic circuitry and particularly to solid state (static) switches and associated circuitry.

2. State of the Art

There has been recent interest in replacing thermal circuit breakers with static switching elements for protective devices in electrical power systems. Particular emphasis in this direction has been in the field of aircraft electrical systems where the higher reliability and other advantages of static elements are particularly desirable. For background, reference may be made to copending application Ser. No. 92,348 filed Nov. 24, 1970 by D. E. Baker and assigned to the assignee of the present invention. The copending application is representative of a type of circuit that does not have inherent current limiting capability, that is, it is operable only between fully on and off states.

One of the desirable functions of either static or electromechanical circuit breakers is to protect the wiring in the system during faults and overloads. Wire current handling capability not only depends on the current magnitude but also the time period such current is present. This capability is often expressed as an $I^2T$ value where $I$ is the current in the load circuit and $T$ is the trip time. For example, for an $I^2T$ value of 4000 amperes²-seconds which is typical for No. 22 wire, any given current (e.g., 20 amperes) larger than the steady state rating of the wire (5.5 amperes for No. 22 wire) must be stopped before a fixed time (10 seconds) elapses.

The $I^2T$ factor is particularly important in aircraft power systems where there is great emphasis in using the lightest wire possible. Of course it is also very desirable not to shut off a load circuit prematurely or unnecessarily. Therefore a means that is responsive to the $I^2T$ value, when it reaches the limit imposed by the wire, is necessary. In the past, thermal circuit breakers could be selected that closely approximated the $I^2T$ capability of the wire. For static switches it is necessary to provide some means that electronically performs this function.

If a straightforward electronic calculator with some form of multiplier were made to calculate the time $I^2T$ and give a trip signal before the $I^2T$ value of the wire is reached, it would be fairly complex and hence relatively expensive to achieve necessary reliability. The "$I^2T$" value referred to is actually the integral of $I^2dt$. Thus it would appear necessary to use a multiplier or squaring circuit to produce the product of $I$ times $I$ and then an integrator to produce the integral of that product over time, $t$.

Various types of electronic time delay circuits are of course known and used in the art of electronic circuitry for various protective functions. However, such protective schemes do not as closely match the actual power handling capabilities of the system, that is, they must be built with a wide safety margin under certain operating conditions to provide a minimal safety margin under others.

SUMMARY

In accordance with this invention an electronic circuit with solid state components is provided that in a relatively simple arrangement of arithmetic stages and an integrator, without requiring a multiplier, provides a reliable and effectively useful approximation of $I^2T$ in a current carrying conductor.

DRAWINGS

PREFERRED EMBODIMENTS

Figure 1:
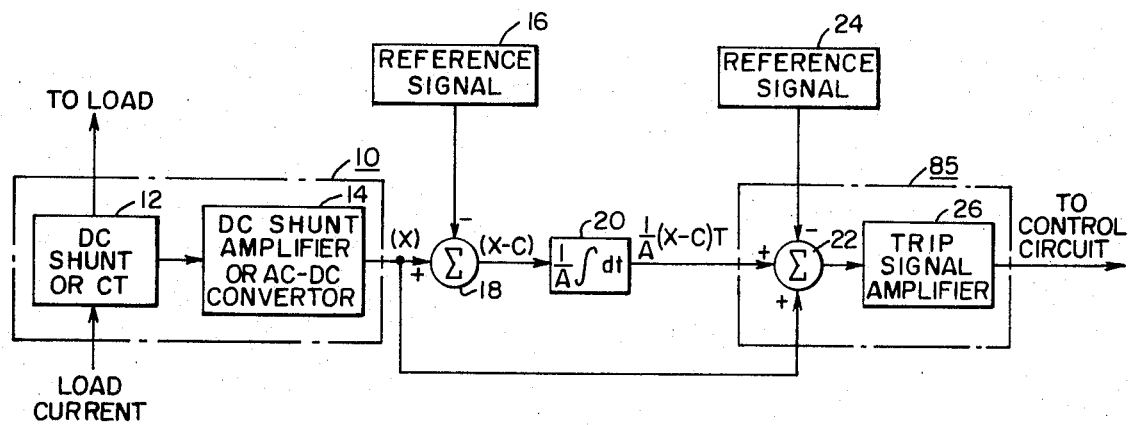
FIG. 1 is a schematic diagram, in functional block form, of an embodiment of the present invention.

Referring to FIG. 1, the general nature of apparatus in accordance with this invention is shown. A means 10 is provided to develop an electrical signal $X$ that is proportional to the load current. The description herein will primarily refer to the operative signals as voltages although a description could also be made in terms of another parameter, such as current. The means 10 includes a signal source 12 that develops a signal from the load current. The signal source 12 is suitable for the type of power in the load circuit. For example, a resistive shunt may be used in a D.C. circuit or a current transformer (CT) may be used in an A.C. circuit. The signal from the source 12 is processed by means 14 such as an amplifier, in the case of D.C., or some form of A.C. to D.C. converter, to produce a voltage, $X$. A reference voltage source 16 supplies a direct voltage $C$ of opposite polarity to $X$ that is subtracted from voltage $X$ at a summing point 18 to produce a new signal $(X-C)$. During the time, $T$, that this difference signal is positive, where $X$ is positive, it is integrated in an integrator 20 that has a gain arbitrarily designated as 1/A seconds. The integrator output, $1/A\ (X-C)T$, is summed at a summing point 22 with the original quantity $X$ and also with a voltage $B$, of opposite polarity to $X$, from reference voltage source 24. The resultant signal $$1/A\ (X-C)T + X - B$$

is supplied to a trip signal amplifier 26 that is responsive to any zero or positive signal to generate a trip signal, that is, when $1/A\ (X-C)T + X - B \geq O$.

From the above, it can be seen that a trip signal is produced when, $$T \geq A(B-X)/(X-C),$$

where $T$ is the time required to produce a trip signal upon occurrence of certain load current;

$X$, $B$, and $C$ are voltages at the points indicated in the schematic of FIG. 1; and $A$ is the inverse of the gain of integrator 20.

Ideally, $T$ should equal $D/X^2$, where $D$ is a constant proportional to the desired $I^2T$ limit. The signal obtained by the FIG. 1 circuit can be shown to closely approximate that condition where $X$ is of a magnitude larger than $C$, and smaller than $B$.

Figure 2:
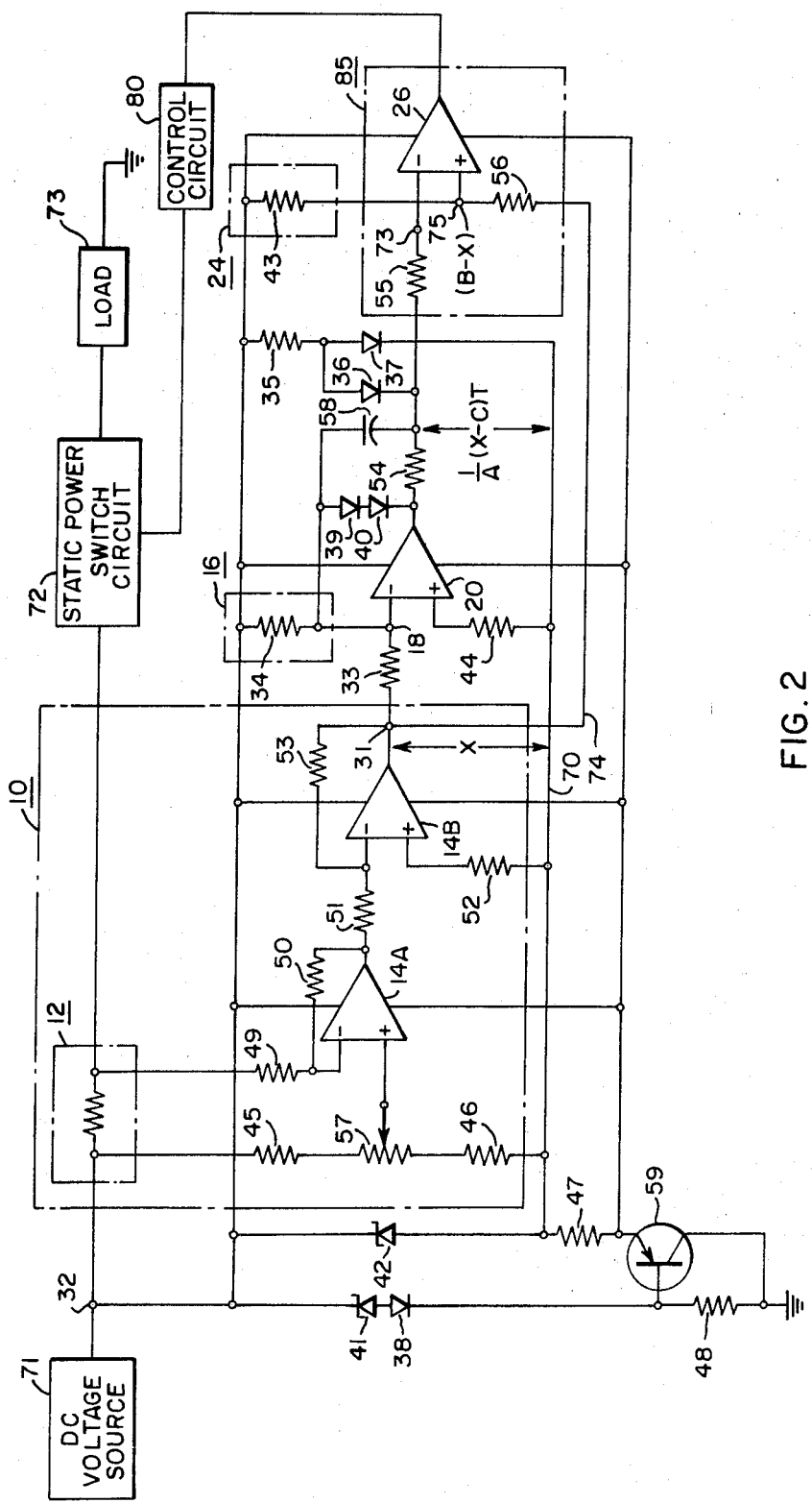
FIG. 2 is a schematic diagram of a more specific example of the present invention.

Referring to FIG. 2, a more detailed schematic diagram of a circuit is shown merely by way of example within the general type shown in FIG. 1. Portions of FIG. 2 are identified by the same reference numerals as corresponding elements of FIG. 1 where appropriate. The FIG. 2 circuit is a D.C. trip circuit that has a means 10 for developing a current into point 18 that has a first component from line 31 that is proportional to the load current.

The voltage applied from line 31 is that referred to as $X$ in the description of FIG. 1. For circuit convenience, $X$ is actually a negative voltage with respect to line 70.

The means 10 includes a D.C. shunt 12 on supply line 32 between D.C. supply 71 and static power switch 72. The D.C. shunt 12 supplies a current dependent signal to operational amplifier stages 14A and 14B that respectively shift the level and amplify the shunt signal, producing the desired signal, $X$.

At a summing point 18 signal $X$ is algebrically added to a positive reference current, developed by a large resistor 34 from the supply 32 (corresponding to means 16 of FIG. 1). This positive current corresponds to reference voltage $C$ referred to in connection with FIG. 1 from source 16. Thus the current into point 18 from 31 and 34 can be referred to as $X-C$. Actually two currents developed through respective resistors 33 and 34 are added at point 18 to develop an $(X-C)$ signal rather than "voltages" per se.

Operational amplifier stage 20 serves to sum the current signals into 18 and also functions as a clamped integrator to produce at its output a signal corresponding to $1/A (X-C)T$ where $1/A$ is the gain of stage 20 and $T$ is the time that $X$ is greater than $C$. Diodes 39 and 40, connected as shown, are to prevent the output of the integrator stage 20 from going too far negative. Resistors 35 and 54 and diodes 36 and 37 prevent the signal from going negative.

If the resistors 54 and 35 are properly selected the current through diodes 36 and 37 will be equal and the voltage at point 73 will be exactly zero unless the signal, $X$, exceeds the reference, $C$.

The signal, $X$, on line 74, is further combined with a signal corresponding to reference voltage $B$ referred to in connection with FIG. 1 from source 24. The voltage at point 75, derived from the currents through resistors 43 and 56 can be referred to as $B-X$.

A final operational amplifier stage 26 has as inputs the integrator output, $1/A(X-C)T$ and the quantity $B-X$. The several inputs are compared by operational amplifier element 26 to produce a trip signal when $1/A(X-CB$ The trip signal produced by element 26 is supplied, usually through an intermediate on-off control circuit 80, to the power switch 72 to turn off the switch, and thus deenergize a load 73.

The dashed line box identified by the reference nuemral 85 in FIG. 2 encloses those elements of the circuit that functionally correspond to the summing point 22 and amplifier 26 of FIG. 1, which are also enclosed by a box 85. The summing function in FIG. 2 is provided partly outside amplifier 26 to develop a $(B-X)$ signal at point 75 and partly within operational amplifier 26 having point 75 connected to the positive amplifier input terminal while the integrated signal from point 73 is supplied to the negative amplifier input terminal.

The circuit of FIG. 2 is merely exemplary and subject to considerable modification using known components and circuit design techniques. The embodiment of FIG. 2 is presently preferred because it requires only a reasonable number of readily available components which can be formed with other control circuitry on a single hybrid substrate to form apparatus suitable as each of the remote power controllers in applications such as aircraft power systems.

The following is a more comprehensive enumeration of the components to be connected as shown in the exemplary circuit of FIG. 2 giving suitable component values or other identification.

| | |
|---|---|
| Operational amplifiers 14A, 14B 20, and 26 | Type 741 (Fairchild μ A741 or equivalent high performance operational amplifier) |
| Diodes 36, 37, 38, 39, and 40 | 1N914 |
| Zener diode 41 | 12v. breakdown |
| Zener diode 42 | 6.4 breakdown, zero temperature coefficient |
| Resistor 34 | 8.2 M. ohms |
| Resistors 35 and 43 | 16 K. ohms |
| Registors 33 and 44 | 430 K. ohms |
| Resistors 45 and 46 | 10 K. ohms |
| Resistor 47 | 1.25 K. ohms |
| Resistor 48 | 1 K. ohms |
| Resistors 49 and 50 | 11 K. ohms |
| Resistor 51 | 2 K. ohms |
| Resistor 52 | 1.6 K. ohms |
| Resistor 53 | 12 K. ohms |
| Resistor 54 | 2.7 K. ohms |
| Resistor 55 | 5.1 K. ohms |
| Resistor 56 | 7.5 K. ohms |
| Resistor 57 | 2 K. ohms variable |
| Capacitor 58 | 1 microf. |
| Transistor 59 | 2N4928 |
| Power source 60 | +28v. D.C. nominal |

The resistor 48, diode 38, zener diode 41, and PNP transistor 59 provide a power supply isolated from ground for the operational amplifiers and associated elements and allow operation over a range of, in this example, from 11 volts to 80 volts for the D.C. supply voltage without adverse affect on performance.

Figure 3:
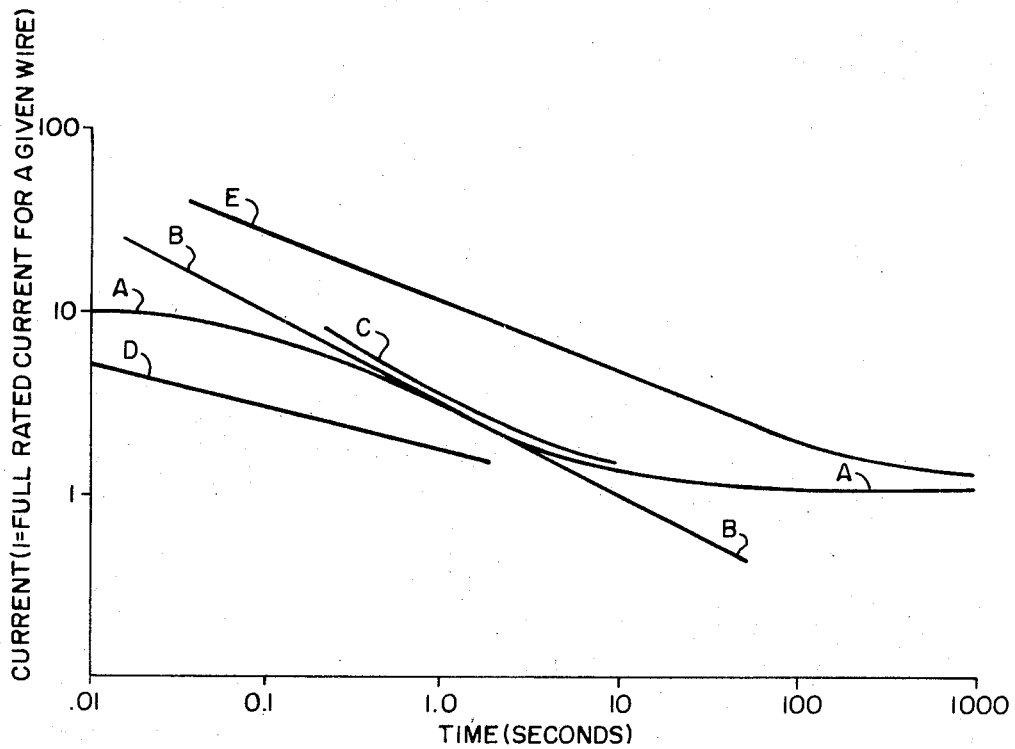
FIG. 3 is a set of curves illustrating the performance of a circuit in accordance with this invention compared with the performance of prior art apparatus.

Circuits as described in the foregoing example have been made and successfully operated. FIG. 3 illustrates the results with current (expressed as a multiple of steady state current rating) plotted against trip time, in seconds, on a log-log scale. Curve A is for the described circuit of FIG. 2. Curve B is a line plotted for $I^2T = 10$(Per Unit amperes)$^2$-seconds where 1 Per Unit Ampere (or 1 P.U. amp.) is 100 percent of rated current. The value of 10 for $I^2I$ is an arbitrarily selected value selected as a protection level for a given wire. Curves A and B show close conformance over a considerable range, from about 1 P.U. to about 10 P.U. amperes which is a desirable range for protection of aircraft wiring. For comparison, curves C and D are shown to indicate the performance limits of typical thermal circuit breakers over the temperature range encountered in aircraft. Curve E is a typical characteristic for an actual wire (e.g. No. 22 wire); this handbook characteristic is determined by the size of wire and the nature of its insulation and represents the level at which actual damage can be expected.

In contrast to thermal circuit beakers, circuits in accordance with this invention are essentially unaffected by temperature changes or vibration. If high quality (low temperature drift) components are used, the circuit will perform within ± 10 percent of the characteristic illustrated by curve A for all temperatures within the above-mentioned range.

Certain types of static switch circuits would not require a tripping circuit as disclosed here. For example, the D.C. static switch circuits of copending applications Ser. Nos. 124,310 and 124,232, both filed Mar. 15, 1971 by D. E. Baker and assigned to the present assignee, have current limiting capability that makes the trip circuit unnecessary. However, there are a number of other types of static switches that need a trip circuit, particularly those in A.C. load circuits.

I claim:

1. Electronic apparatus for producing a signal indicating a current on a conductor has endured for a time endangering the conductor's safety comprising: means to develop a first signal having a parameter of magnitude proportional to the magnitude of current in the conductor; means to sum said first signal with a reference second signal of opposite sign to said first signal and of smaller magnitude to develop a difference signal; means to integrate said difference signal with time to develop an integrated signal; and means to sum (1) a reference third signal of opposite sign to said first signal and of larger magnitude, (2) said integrated signal, and (3) said first signal.

2. The subject matter of claim 1 further comprising: means responsive to the algebraic sum of voltages (1), (2) and (3) to produce a trip signal whenever the sum is zero or of the same sign as said first voltage.

3. The subject matter of claim 2 wherein: said named means comprise active electronic circuit elements all of which are solid state.

* * * * *